(12) United States Patent
Park et al.

(10) Patent No.: US 8,602,572 B2
(45) Date of Patent: Dec. 10, 2013

(54) BELT SUPPORTING TYPE REFLECTING MIRROR MOUNT (75) Inventors: Kwijong Park, Daejeon (KR); Jakyoung Nah, Daejeon (KR); Dae-Hee Lee, Daejeon (KR)

(73) Assignee: Korea Astronomy and Space Science Institute, Daejeon (KR)

( * ) Notice: Subject to any disclaimer, the term of this patent is extended or adjusted under 35 U.S.C. 154(b) by 143 days.

(21) Appl. No.: 13/347,112

(22) Filed: Jan. 10, 2012

(65) Prior Publication Data
US 2013/0010381 A1 Jan. 10, 2013

(30) Foreign Application Priority Data
Jul. 4, 2011 (KR) .................. 10-2011-0065965

(51) Int. Cl.
*G02B 7/182* (2006.01)
(52) U.S. Cl.
USPC .......................................... 359/871

(58) Field of Classification Search
USPC ............................................ 359/557, 871–880
See application file for complete search history.

(56) References Cited

U.S. PATENT DOCUMENTS 6,307,678 B2 * 10/2001 Kosaka et al. ................ 359/557

* cited by examiner

*Primary Examiner* — Euncha Cherry
(74) *Attorney, Agent, or Firm* — Drinker Biddle & Reath LLP (57) ABSTRACT

A belt supporting type reflecting mirror mount that is capable of minimizing an amount of deformation of the reflection plane of a reflecting mirror and supporting the reflecting mirror. The reflecting mirror mount comprises a base, a fork coupled to the base so as to be able to be swiveled, a frame hinged to the fork which has a reflecting mirror disposed therein, at least one load support installed on the frame and supporting a load of the reflecting mirror applied in an optical axial direction, and a belt fastener that has a belt supporting a circumference of the reflecting mirror, and belt supports installed on the frame and fixedly supporting opposite ends of the belt. Thereby, the load of the reflecting mirror is uniformly distributed across the belt.

12 Claims, 11 Drawing Sheets

BELT SUPPORTING TYPE REFLECTING MIRROR MOUNT

CROSS-REFERENCE TO RELATED APPLICATION

This application claims the priority of Korean Patent Application No. 10-2011-0065965, filed Jul. 4, 2011 in the Korean Patent Office, which is incorporated herein by reference in its entirety

BACKGROUND

1. Field of the Invention

The invention relates, in general, to a belt supporting type reflecting mirror mount, and, more particularly, to a belt supporting type reflecting mirror mount capable of minimizing an amount of deformation of a reflection plane in a reflecting mirror used for a telescope and stably supporting the reflecting mirror.

2. Description of the Related Art

Performance of a reflecting mirror is dependent upon the surface precision of a reflection plane (reflecting mirror surface) of the reflecting mirror, because a path difference is not generated when the proportion of light that is reflected from the reflecting mirror is proportional to the surface precision of the reflection plane of the reflecting mirror.

Thus, ultra-precision machining technology is applied to the reflecting mirror in order to enhance the surface precision of the reflection plane. The surface precision of the reflection plane of the reflecting mirror used for the telescope is generally within 20 nm.

To test the reflecting mirror that is precisely machined according to the machining requirements or to actually attach and use the reflecting mirror to a system, a structure should be provided so as to be able to stably support the reflecting mirror and maintain a position where the reflecting mirror is installed without change.

The performance of the reflecting mirror is greatly influenced by the surface precision of the reflection plane as well as by the type of support, the shape, etc. of the structure for supporting the reflecting mirror. In detail, when the reflecting mirror supporting structure is inappropriately designed although the reflection plane is machined with a surface precision within 20 nm, the reflection plane may be deformed by dead weight of the reflecting mirror, so that it is impossible to expect preferable performance of the reflecting mirror.

For this reason, there is a need to develop the reflecting mirror supporting structure capable of supporting the reflecting mirror without having an influence on the reflection plane of the reflecting mirror.

In addition, the reflecting mirror should be installed so as to reflect incident light to be collected on a predetermined spot (focal point). Thus, it is necessary to minutely adjust the installation of the reflecting mirror. As such, there is a need to develop a reflecting mirror support structure which can be swiveled and/or tilted as needed even when the reflecting mirror is stably supported.

SUMMARY

Accordingly, the invention has been made keeping in mind the above problems occurring in the related art, and the invention is intended to propose a belt supporting type reflecting mirror mount capable of stably supporting a reflecting mirror, swiveling and/or tilting the reflecting mirror, adjusting a belt and a supporting structure depending on a diameter and a thickness of the reflecting mirror, and making it easy to assemble the belt.

An embodiment of the invention provides a belt supporting type reflecting mirror mount, which comprises: a base; a fork coupled to the base so as to be able to be swiveled; a frame hinged to the fork, a reflecting mirror being disposed on an inside of the frame; at least one load support installed on the frame and supporting a load of the reflecting mirror applied in an optical axial direction; and a belt fastener that has a belt supporting a circumference of the reflecting mirror, and belt supports that are installed on the frame and fixedly support opposite ends of the belt.

Each belt support comprises: a pair of belt fixtures between which a first end of the belt is fitted; a fixture friction that is installed on the belt fixtures and fixes the belt using frictional force; a pair of belt flexors that is fixed to the belt fixtures at a first end thereof and defines a length adjusting slit through which the belt is guided; a slider that is fixed to a second end of the belt flexors and is slidably installed on the frame; and a slider friction that is installed on the frame and fixes the slider using friction.

Further, each belt support may further comprise a belt positioner that fixes the belt to the circumference of the reflecting mirror so as to prevent the belt from being fluctuated. Here, the belt positioner may comprise an upper positioner having an elongated hole, and a lower positioner that is installed to be symmetrical with the upper positioner and has an elongated hole. The upper and lower positioners may slide along the elongated holes to adjust the interval between them.

Meanwhile, the frame may contain slide slots, and the sliders may be slidably installed in respective slider slots.

Further, the load support may comprise: a first support that is installed on the frame so as to slide relative to the frame and be able to be positioned; and a second support that is coupled to the first support, supports the circumference of the reflecting mirror, and is installed so as to slide relative to the first support in order to be adjusted in height. Here, the second support may be formed as a leaf spring.

Further, the belt supporting type reflecting mirror mount may further comprise: a first micro-adjustor that is installed between the base and the fork and swivels the fork; and a second micro-adjustor that is installed between the fork and the frame and tilts the frame. The first or second micro-adjustor may comprise a stationary bracket, a movable bracket that is installed apart from the stationary bracket, tension springs that are installed between the stationary bracket and the movable bracket, and an adjusting bar that is coupled to the stationary bracket and moves the movable bracket.

The movable bracket may comprise an opening, and the adjusting bar may pass through the opening, and move forward and backward.

Meanwhile, the belt supporting type reflecting mirror mount may further comprise a safety support that is installed on the frame and prevents the reflecting mirror from falling down. Here, the safety support may comprise: an angle that is installed on the frame; and a reflecting mirror prop that is coupled to the angle so as to be able to move up and down, which supports the circumference of the reflecting mirror, and which has a belt constraint recess in which the belt is constrained.

Further, the frame may contain a plurality of leveling feet supporting one surface of the reflecting mirror. The frame may also contain a plurality of elongated leveling foot fixture holes, and the leveling feet may be installed and positioned in the respective leveling foot fixture holes.

According to the invention, since only the load of the reflecting mirror applied in a direction perpendicular to an optical axial direction is uniformly distributed throughout the belt supporting the reflecting mirror along the circumference of the reflecting mirror, it is possible to minimize the amount of deformation of the reflecting mirror.

Further, the fork and the frame are swiveled and/or tilted using the first and second micro-adjustors as needed, so that it is possible to precisely adjust an angle at which the reflecting mirror is installed. Thus, it is possible to accurately collect incident light in a focal direction.

In addition, since the reflecting mirror can be supported by adjusting installation of the belt and the supporting structure depending on the diameter and thickness of the reflecting mirror, applications of the reflecting mirror mount are not limited to the reflecting mirror having a specific size.

BRIEF DESCRIPTION OF THE DRAWINGS

The above and other embodiments, features and other advantages of the invention will be more clearly understood from the following detailed description when taken in conjunction with the accompanying drawings, in which.

DETAILED DESCRIPTION OF THE INVENTION

Reference will be made in greater detail to the construction and operation of a belt supporting type reflecting mirror mount according to an exemplary embodiment of the invention with reference to the accompanying drawings.

Figure 1:
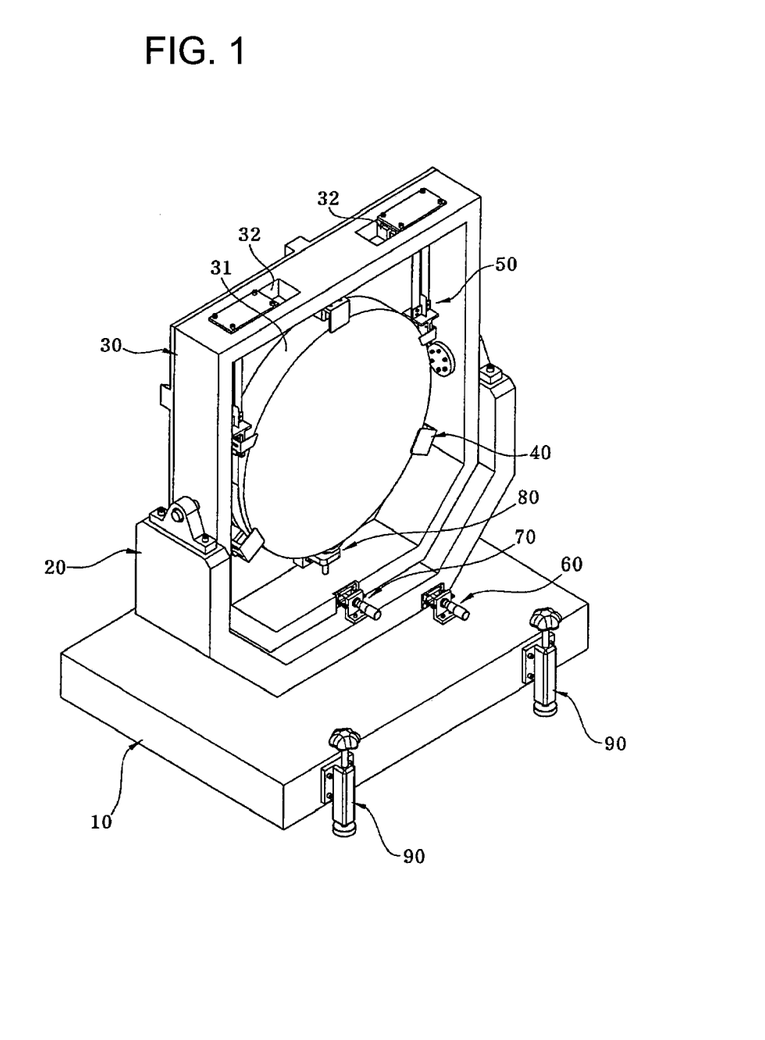
FIG. 1 is a perspective view showing a belt supporting type reflecting mirror mount according to an embodiment of the invention.
Figure 2:
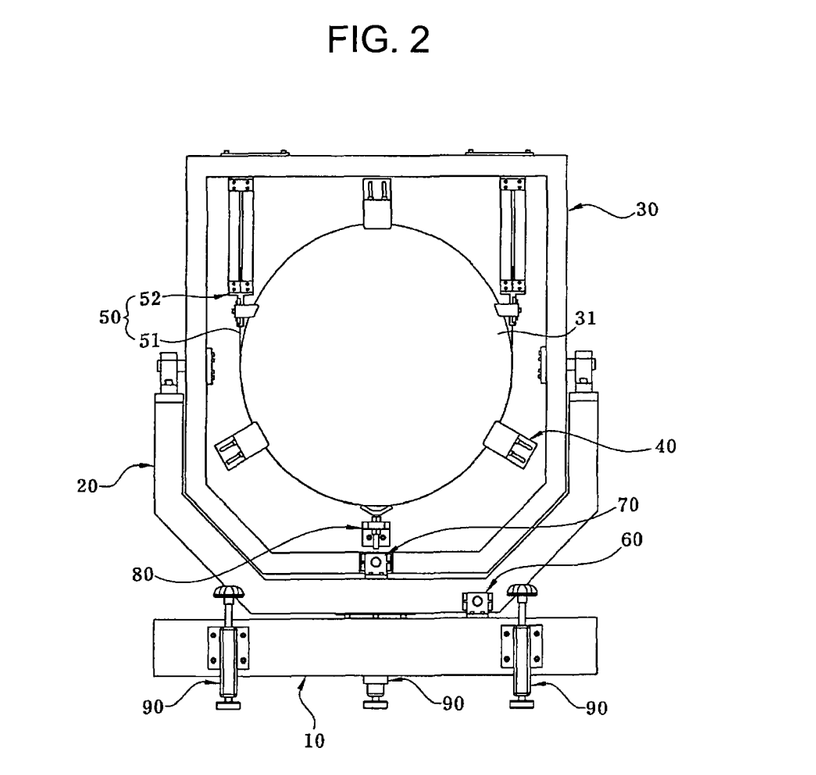
FIG. 2 is a front view of FIG. 1.

The invention is directed toward a reflecting mirror mount of a belt supporting type capable of minimizing an amount of deformation of the reflection plane of a reflecting mirror and stably supporting the reflecting mirror. As shown in FIGS. 1 and 2, the reflecting mirror mount generally comprises a base 10, a fork 20, a frame 30, at least one load support 40, and a belt fastener 50.

The base 10 has the shape of a quadrilateral box that is installed on a floor or a ground in a horizontal direction, and is provided with a mounting hole 11 in the center thereof so as to be able to firmly install the fork 20, which will be described below, in such a manner that the fork 20 can be rotated or swiveled. A bearing 12 is fitted into the mounting hole 11. A rotary shaft 13 is rotatably fitted into the bearing 12 and is in contact with an inner race of the bearing 12. The rotary shaft 13 is fastened to the fork 20 by fasteners such as bolts.

Further, to install the base 10 in a horizontal direction, at least one level adjustor 90 may be provided on a circumference of the base 10. As this level adjustor 90, a height adjusting device having a typical structure is used, which is made up of, for instance, a bolt and a nut, so as to be able to precisely adjust its height off of the floor by performing a loosening or tightening operation.

Figure 3:
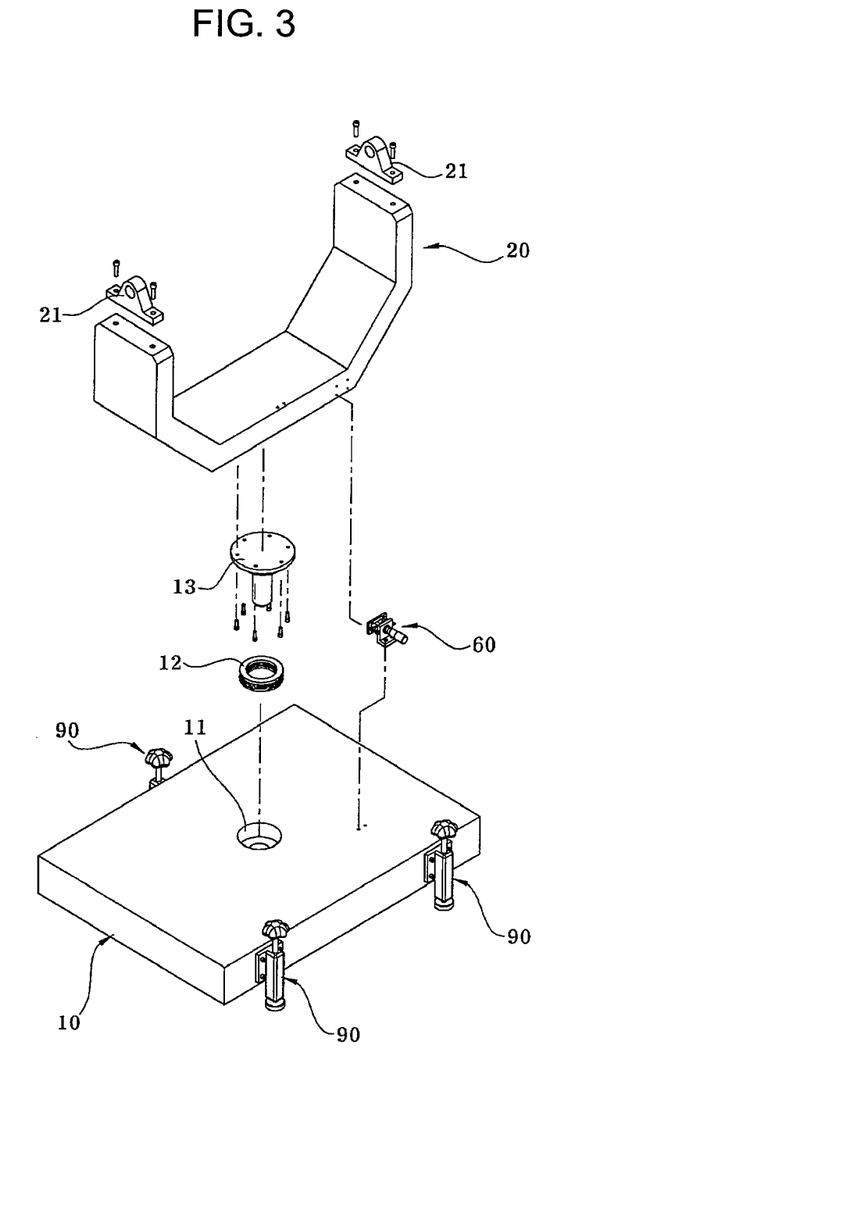
FIG. 3 is a disassembled perspective view of a base and a fork according to an embodiment of the invention.

As shown in FIG. 3, the fork 20 has a U shape. The frame 30, which will be described below, is rotatably hinged to the fork 20. To this end, hinge brackets 21 are installed on opposite ends thereof.

The rotary shaft 13 of the base 10 is coupled to a lower middle portion of the fork 20. Thereby, the fork 20 can be swiveled about the base 10.

Figure 4:
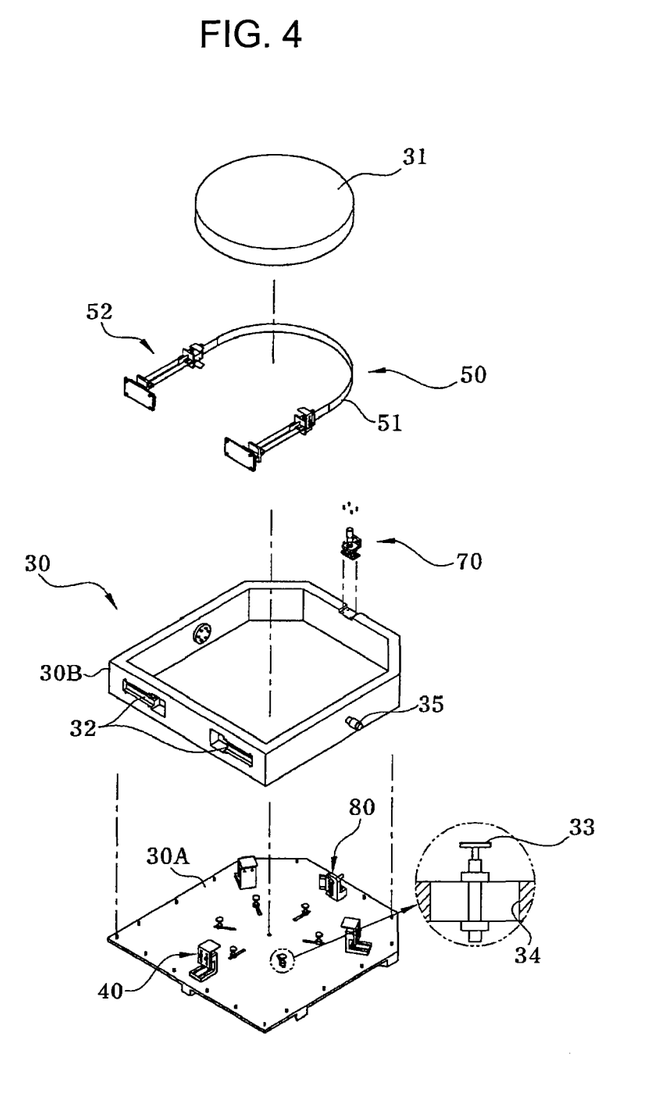
FIG. 4 is a disassembled perspective view of a frame, a belt, and a reflecting mirror according to an embodiment of the invention.

As shown in FIG. 4, the load support 40 and the belt fastener 50 are installed on the frame 30 along with a reflecting mirror 31. The frame 30 comprises a base plate 30A and a stationary frame 30B installed on an edge of the base plate 30A.

The base plate 30A is configured so that a plurality of load supports 40 are disposed around the reflecting mirror 31 at regular intervals so as to be able to support the circumference of the reflecting mirror 31.

Further, the base plate 30A is provided with a plurality of leveling feet 33 on a central portion thereof which are disposed in a radial direction so as to support a load of the reflecting mirror 30 applied in an optical axial direction and to allow precise height adjustment (i.e. precise leveling). As shown in the enlarged view of FIG. 4, each leveling foot 33 is configured so that a leveling screw (no reference number) is installed along with two nuts (no reference number) via a leveling foot fixture hole 34 of the base plate 30A so that an upper portion of the leveling screw is in contact with a rear surface of the reflecting mirror 31. Thereby, a height of each leveling foot 33 is adjusted by tightening or loosening the nuts.

Here, each leveling foot fixture hole 34 is formed in an elongated hole so as to be able to freely adjust the installation position of the corresponding leveling foot 33.

The leveling feet 33 having this structure are installed on the base plate 30A at regular intervals within the number of 3 to 8, so that the installation height of the reflecting mirror 31 can be uniformly supported and simultaneously precisely adjusted.

Figure 5:
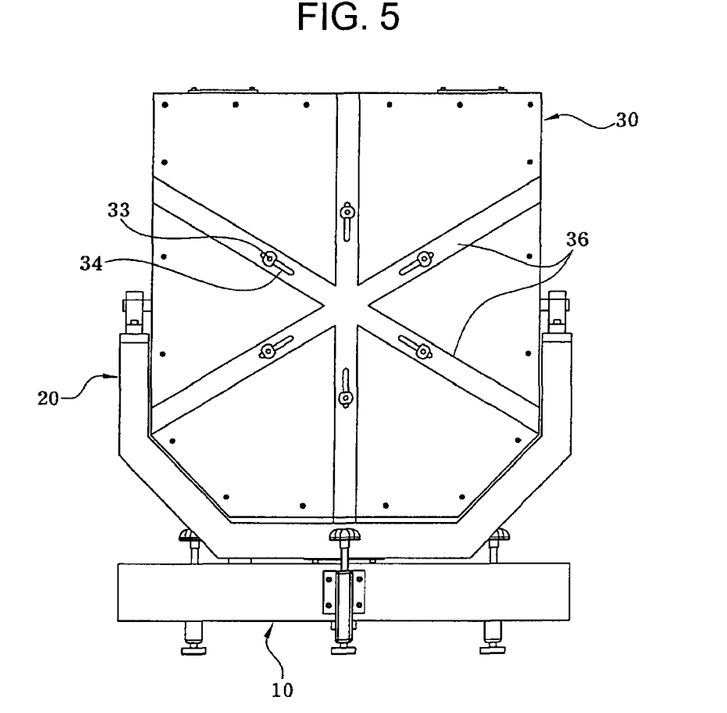
FIG. 5 is a rear view showing a belt supporting type reflecting mirror mount according to an embodiment of the invention.

As shown in FIG. 5, reinforcement beams 36 may be further provided on a rear surface of the base plate 30A at positions corresponding to the positions where the leveling foot fixture holes 34 are formed. These reinforcement beams 36 function to prevent the base plate 30A from being deformed by a tightening force of the nuts and to robustly maintain the shape of the base plate 30A.

The stationary frame 30B is installed along an edge of the base plate 30A, thereby reinforcing strength of the base plate 30A. As shown in FIG. 5, hinging shafts 35 are installed on opposite sides of the stationary frame 30B, respectively. These hinging shafts 35 are coupled with the hinge brackets 21 of the fork 20, so that a tilting angle of the frame 30 can be adjusted.

Further, among the sides of the stationary frame 30B, one side in which the hinging shafts 35 are not installed is provided with a pair of slide slots 32 to which sliders 52D of each belt support 52, which will be described below, is slidably coupled.

Figure 6A:
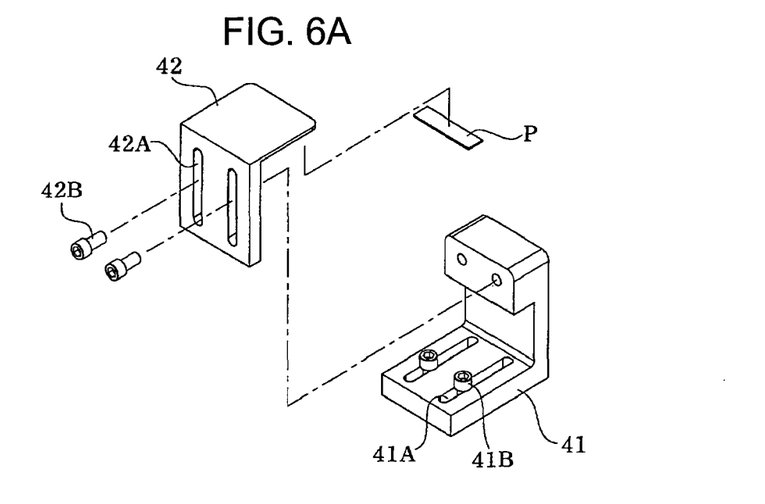
FIGS. 6A, 6B and 6C are perspective views showing examples of a load support according to an embodiment of the invention.
Figure 6B:
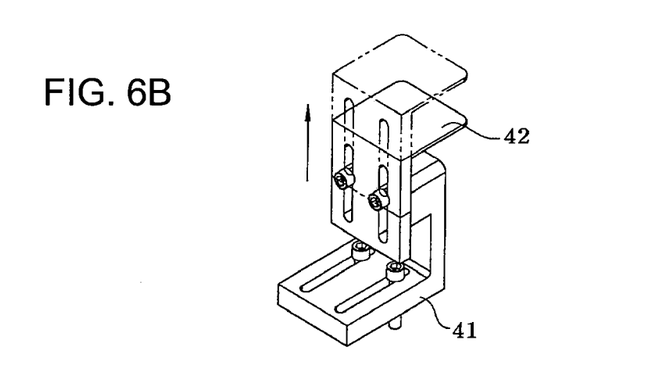
Figure 6C:
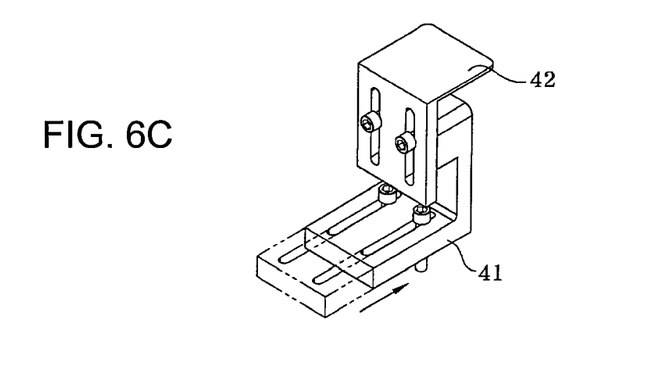

The load support 40 is constructed so that its installation position and height can be adjusted depending on a diameter and thickness of the reflecting mirror 31. To this end, as shown in FIGS. 6A, 6B and 6C, the load support 40 comprises a first support 41 that is installed on the frame 30 so as to be able to be positioned by sliding relative to the frame 30, and a second support 42 that is slidably coupled to the first support 41, supports the circumference of the reflecting mirror 31, and is installed so as to be able to be adjusted in height. The load of the reflecting mirror 31 applied in an optical axial direction is supported by the load support 40 and the plurality of leveling feet 33.

The second support 42 is attached with a mirror protection pad P such that the reflection plane of the reflecting mirror is not damaged as a result of making contact with the reflecting mirror 31. Alternatively, the second support 42 may be implemented as a leaf spring. Thereby, the circumference of the reflecting mirror 31 is pressed and fixed by the resilient force of the leaf spring.

The belt fastener 50 is designed to support the load of the reflecting mirror 31 applied in an optical axial direction. To this end, as shown in FIG. 7A, the belt fastener 50 comprises a belt 51 that is formed of a flexible material and surrounds and supports the circumference of the reflecting mirror 31, and belt supports 52 that are installed on the frame 30 and fixedly support opposite ends of the belt 51.

Each belt support 52 is made up of: a pair of belt fixtures 52A between which one end of the belt 51 is fitted; a fixture friction 52B that is installed on the belt fixtures 52A and fixes the belt 51 using a frictional force; a pair of belt flexors 52C that is fixed to the belt fixtures 52A at one end thereof and defines a length adjusting slit H through which the belt 51 is guided; a slider 52D that is fixed to the other end of the belt flexors 52C and is slidably installed on the frame 30; and a slider friction 52E that is installed on the frame 30 and fixes the slider 52D using friction.

Here, the slider 52D is installed and slides in the slide slot 32. The belt support 52 may be further provided with a belt positioner 52G that prevents the belt 51 from moving undesirably and becoming distorted.

Figures 7A, 7B:
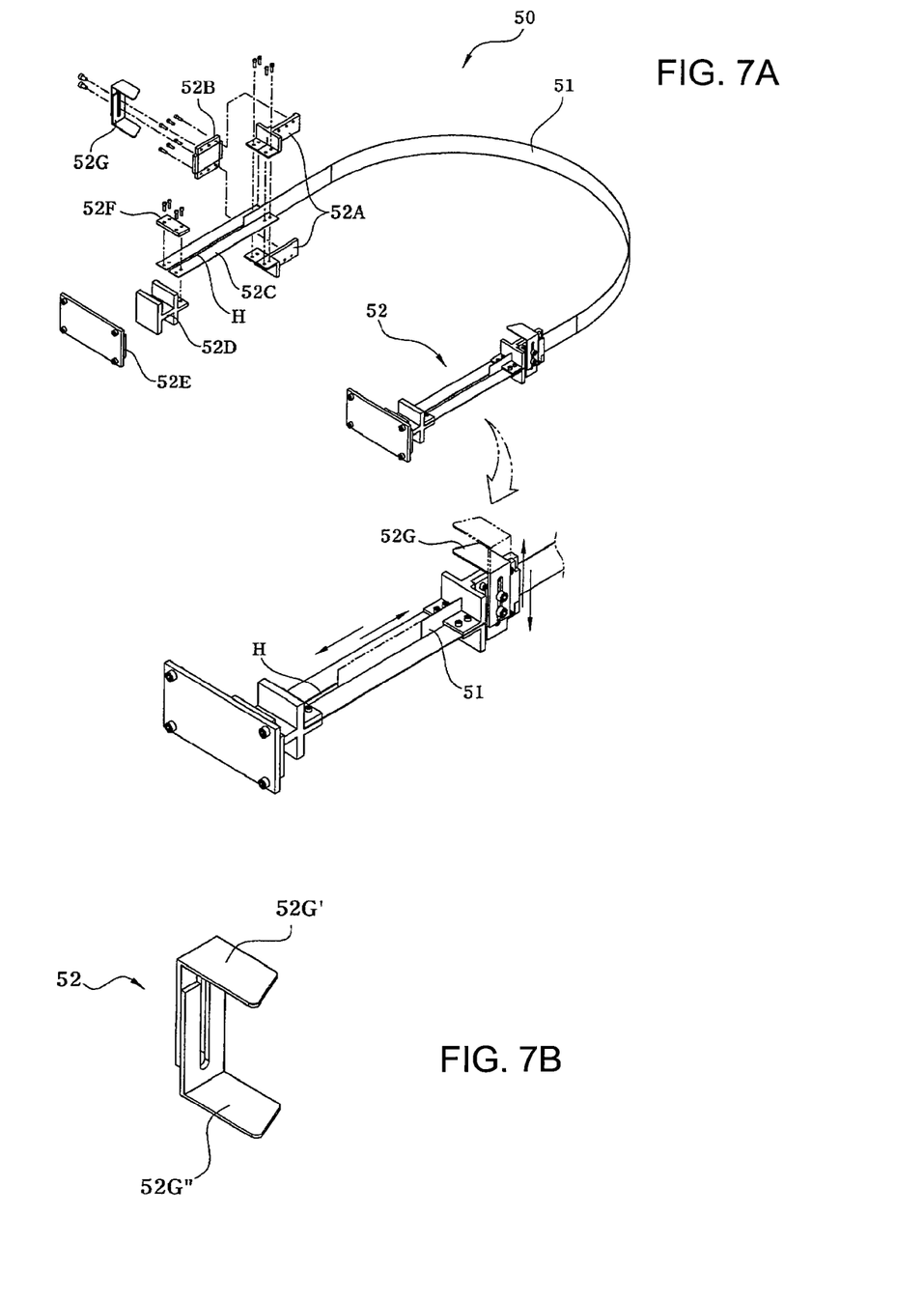
FIG. 7A is a disassembled perspective view showing an example of a belt according to an embodiment of the invention.
FIG. 7B is a perspective view showing an example of a belt positioner according to an embodiment of the invention.

As shown in FIG. 7B, the belt positioner 52G comprises an upper positioner 52G' having an elongated hole and a lower positioner 52G" that has an elongated hole and is installed so as to be symmetrical with the upper positioner 52G'. A fastening member passing through the upper and lower positioners 52G' and 52G" is fastened to the belt support 52. The upper and lower positioners 52G' and 52G" slide along the elongated holes to adjust the interval between them.

Meanwhile, the belt flexors 52C may be directly fixed to the slider 52D. However, the belt fastener 50 further comprises a flexor fixture 52F so as to facilitate replacing the belt flexors 52C. Fastening members are used to assemble the flexor fixture 52F with the slider 52D by interposing the belt flexors 52C therebetween. In this case, the fastening members pass through and fix the other ends of the belt flexors 52C.

Figure 8:
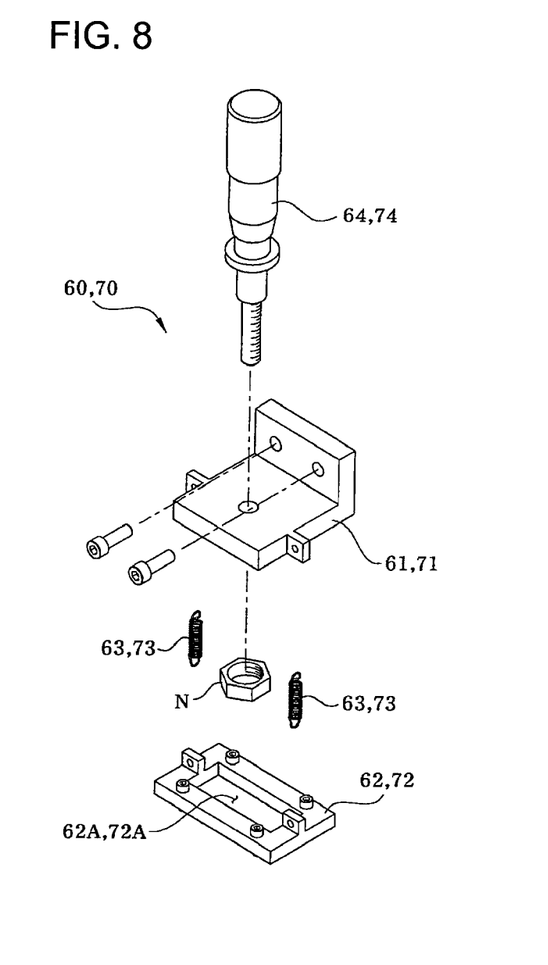
FIG. 8 is a disassembled perspective view showing an example of a first or second micro-adjustor according to an embodiment of the invention.

When the reflecting mirror mount of the invention is swiveled and/or tilted, first and second micro-adjustors 60 and are designed to be able to more precisely adjust the swiveling and/or tilting operations. To this end, as shown in FIG. 8, the first or second micro-adjustor 60 or 70 comprises a stationary bracket 61 or 71, a movable bracket 62 or 72 that is installed apart from the stationary bracket 61 or 71, tension springs 63 or 73 that are installed between the stationary bracket 61 or 71 and the movable bracket 62 or 72, and an adjusting bar 64 or 74 that is coupled to the stationary bracket 61 or 71 and is rotated to move the movable bracket 62 or 72.

Figure 9A:
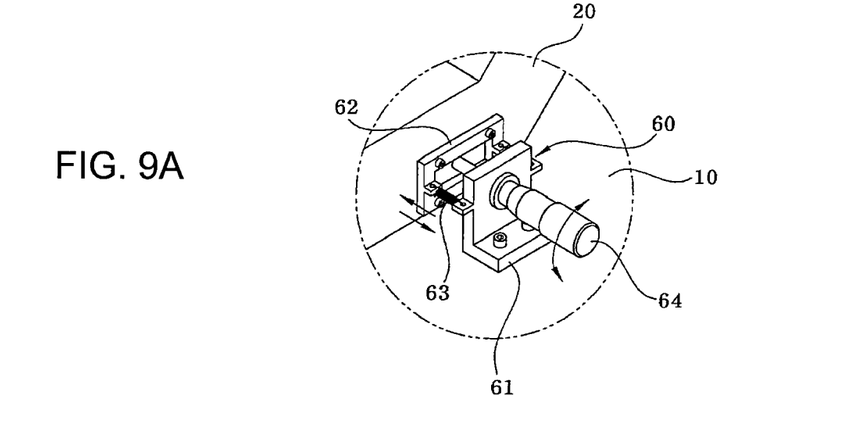
FIGS. 9A and 9B show how to use first and second micro-adjustors according to an embodiment of the invention.

In the first micro-adjustor 60, as shown in FIG. 9A, the stationary bracket 61 is fixed to the base 10, and the movable bracket 62 is installed on the fork 20. Thus, the adjusting bar 64 is rotated to push the movable bracket 62, thereby swiveling the fork 20.

Figure 9B:
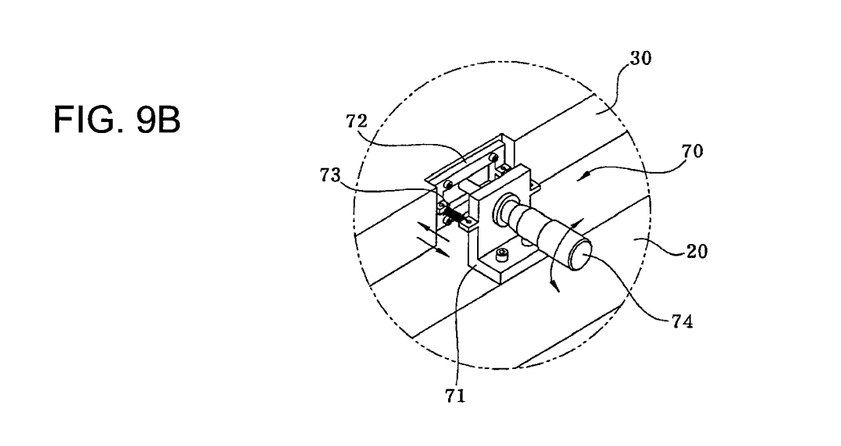

In the second micro-adjustor 70, as shown in FIG. 9B, the stationary bracket 71 is fixed to the fork 20, and the movable bracket 72 is installed on the frame 30. Thus, the adjusting bar 74 is rotated to push the movable bracket 72, thereby tilting the frame 30.

Here, the adjusting bar 64 or 74 is directly screwed into a through-hole of the stationary bracket. Alternatively, the adjusting bar 64 or 74 may be coupled to the stationary bracket via a separate nut N.

Figure 10:
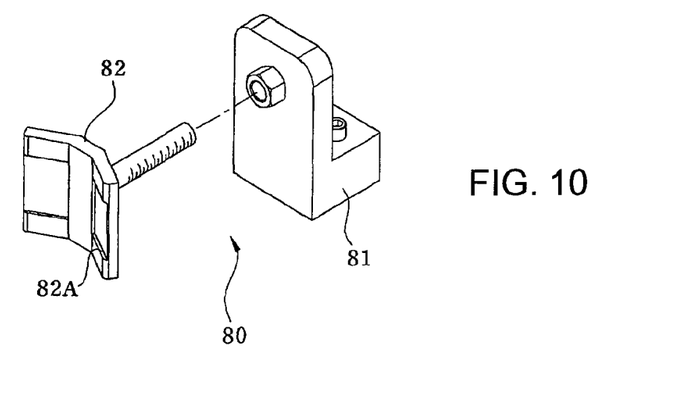
FIG. 10 is a disassembled perspective view showing an example of a safety support according to an embodiment of the invention.

A safety support 80 is installed on the frame 30, and functions to prevent the reflecting mirror 31 from falling down when the belt 51 is loosened or broken. As shown in FIG. 10, the safety support 80 having this function comprises an angle 81 that is installed on the frame 30, and a reflecting mirror prop 82 that is coupled to the angle 81 so as to be able to move up and down, supports the circumference of the reflecting mirror 31, and has a belt constraint recess 82A in which the belt 51 is constrained.

The reflecting mirror 31 stands at a predetermined angle when used. Here, when the belt 51 surrounding and supporting the reflecting mirror 31 is abnormal, there is a fear that the reflecting mirror 31 will sag or falls down in a vertical direction. For this reason, the safety support 80 is installed below the reflecting mirror 31 with a predetermined gap therebetween so as to be able to prepare for this possibility.

The safety support 80 is formed of a flexible material such as rubber, and a cross section thereof has a shape corresponding to the circumference of the reflecting mirror 31.

Further, the safety support 80 is used when the belt 51 is assembled on the circumference of the reflecting mirror 31. The belt 51 passes between the safety support 80 and the reflecting mirror 31, and then the safety support 80 is brought into close contact with the circumference of the reflecting mirror 31. Thereby, the belt 51 can be mounted at a desired height through the belt constraint recess 82A of the safety support 80. After the belt 51 is assembled, the safety support is spaced apart from the reflecting mirror 31 at a predetermined interval so as to prevent the reflecting mirror 31 from falling down.

When the load of the reflecting mirror 31 is not applied to the belt 51 in an optical axial direction, the load of the reflecting mirror 31 is uniformly distributed on the entire belt 51, so that the amount of deformation of the reflecting mirror 31 can be minimized.

When the reflecting mirror 31 is inclined because the assembly is not precise or for any other reason, the load of the reflecting mirror 31 is applied to the belt 51 in an optical axial direction. In this case, the belt 51 is subjected to a shear strain, so that the load of the reflecting mirror 31 is not uniformly distributed across the belt 51, and thus the reflection plane of the reflecting mirror 31 may be deformed.

For this reason, as shown in FIG. 7A, the belt positioner 52G is mounted on the belt fixtures 52A, and is fixed to the reflecting mirror 31 when the reflecting mirror 31 is inclined.

The pair of belt flexors 52C formed of a thin strip is installed on the belt fixtures 52A, and thus is first deformed by the optical axial load of the reflecting mirror 31.

Thereby, the belt 51 is safe from such undesirable motions as deviating from the circumference of the reflecting mirror 31, or from such deformations as distortion. As a result, the optical axial load of the reflecting mirror 31 is uniformly distributed across the belt 51.

Here, the interval of the belt positioner 52G is adjusted so that the belt 51 can be fixed regardless of the thickness of the reflecting mirror 31. Since the upper and lower belt positioners 52G' and 52G" of the belt positioner 52G are assembled with the elongated holes thereof aligned with each other, the upper and lower belt positioners 52G' and 52G" slide along the aligned elongated holes, and thus come into close contact with the front and rear surfaces of the reflecting mirror 32. Thereby, the interval between the upper and lower belt positioners 52G' and 52G" is easily adjusted.

Meanwhile, since the sliders 52D are slidably assembled in the respective slide slots 32 of the frame 30, the interval between the two sliders 52D can be properly adjusted depending on the diameter of the reflecting mirror 31. After the belt 51 is adjusted so as to be in close contact with the circumference of the reflecting mirror 31, the sliders 52D are fixed by the respective slider frictions 52E.

Here, the slider friction 52E firmly comes into close contact with one surface of the slider 52D by the strength of being fastened to the slider slot 32, increasing the friction so that the slider 52D is fixed.

Further, when the safety support 80 and the belt fixtures 52A are used, the belt 51 can be accurately mounted on the circumference of the reflecting mirror 31. The sequence of mounting the belt 51 on the circumference of the reflecting mirror 31 is as follows.

First, the belt 51 is fitted into the belt constraint recess 82A of the safety support 80 and between the belt fixtures 52A so as to surround the circumference of the reflecting mirror 31 placed on the leveling feet 33, and is aligned with the circumference of the reflecting mirror 31. Then, the opposite ends of the belt 51 are pulled between the pair of belt flexors 52C assembled to the belt fixtures 52A, i.e. through the length adjusting slit H, thereby bringing the belt 51 into close contact with the circumference of the reflecting mirror 31. The fixture friction 52B is strongly tightened to fix the belt 51.

Here, since the belt 51 is guided through the length adjusting slit H, the length of the belt 51 can be more easily adjusted.

As described above, since the belt fastener 50 is made up of the belt 51, the belt fixtures 52A, the fixture frictions 52B, the belt flexors 52C, the sliders 52D, the slider frictions 52E, the flexor fixtures 52F, and the belt positioners 52G, it is easy to install the belt 51, and it is possible to easily adjust the length of the belt 51 to suit the thickness of the reflecting mirror 31. Further, since the belt supports only the load of the reflecting mirror 31 in a direction perpendicular to the optical axial direction using the belt flexors 52C, it is possible to minimize the amount of deformation of the reflecting mirror 31.

Figure 11:
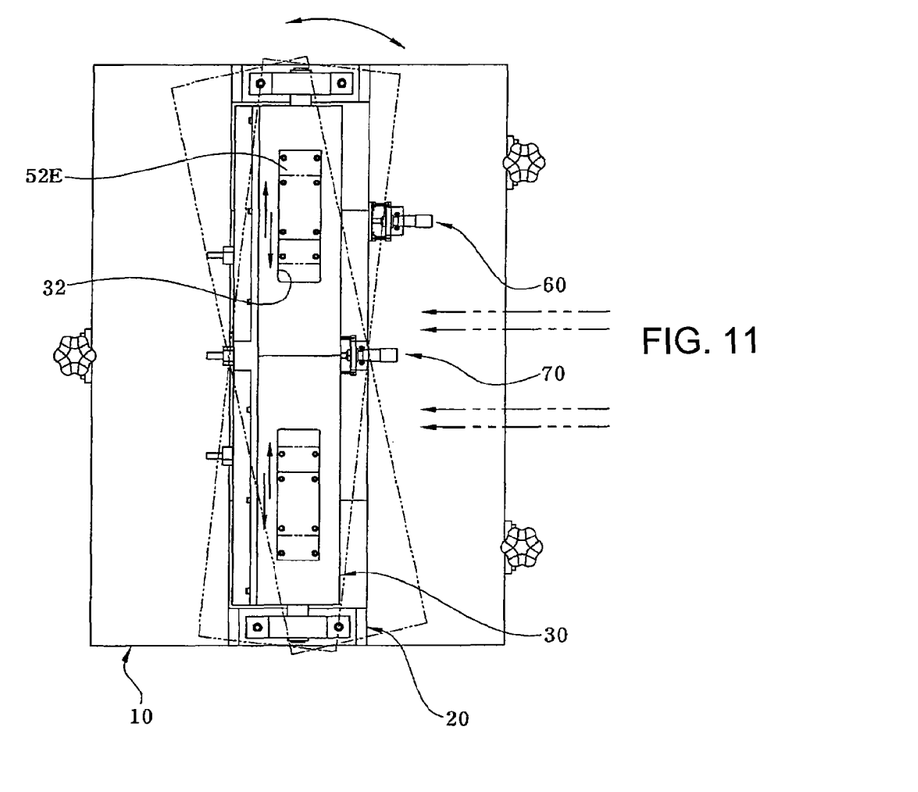
FIG. 11 is a plan view showing an example of a swiveling operation of a fork according to an embodiment of the invention.
Figure 12:
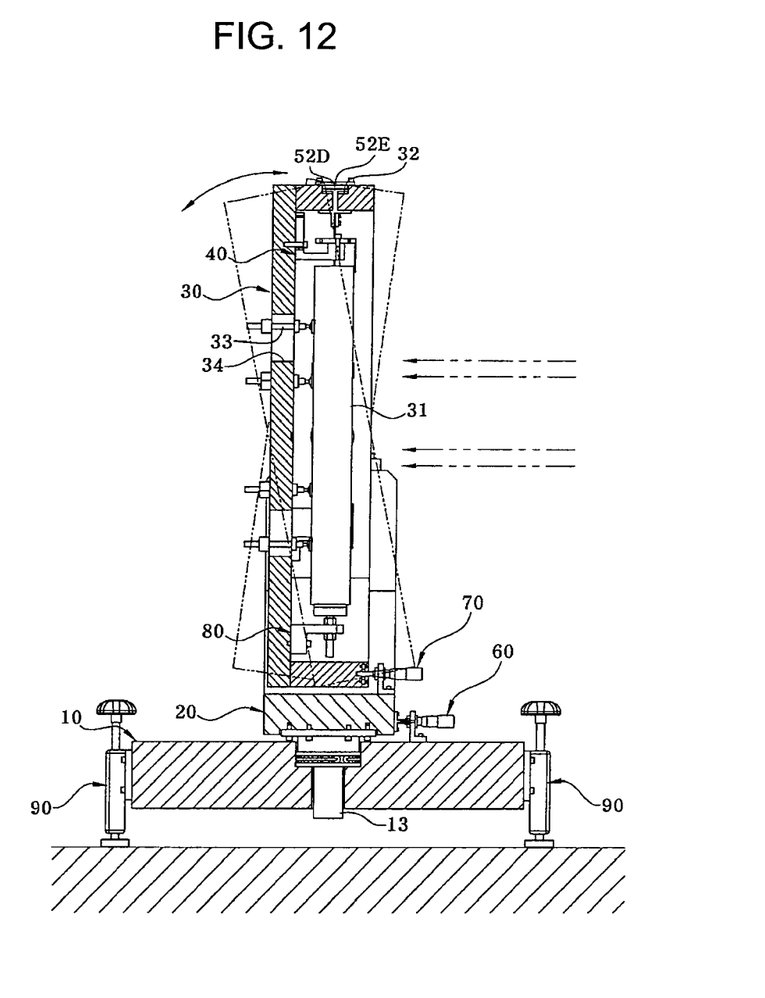
FIG. 12 is a side cross-sectional view showing an example of a tilting operation of a frame according to an embodiment of the invention.

Further, the interval between the stationary bracket 61 and the movable bracket 62 and the interval between the stationary bracket 71 and the movable bracket 72 can be precisely adjusted by rotating the respective adjusting bars 64 and 74 of the first and second micro-adjustors 60 and 70. As a result, the fork 20 is precisely swiveled as shown in FIG. 11, and the frame 30 is precisely tilted as shown in FIG. 12. Thereby, an angle of reflection of the reflecting mirror 31 is adjusted by the first and second micro-adjustors 60 and 70, so that the incident light can be accurately collected on a focal point.

Hereinafter, a process of assembling the inventive belt supporting type reflecting mirror mount constructed as described above will be described.

First, the base 10 is installed on the ground (or an installation surface), and is leveled by manipulating the level adjustor 90.

Then, the fork 20 is coupled to the rotary shaft 13 of the base 10. The hinging shafts 35 of the frame 30 are coupled using the hinge brackets 21 formed at the opposite ends of the fork 20.

After the base 10 is coupled to the fork 20, the frame 30 is rotated at an angle of 90 degrees so as to be level with the ground. After the reflecting mirror 31 is placed on the leveling feet 33 of the frame 30, the interval between the opposite sliders 52D is adjusted with the slide slots 32, and the sliders 52D are fixed using the slider frictions 52E.

When the sliders 52D are fixed, the belt flexors 52C are installed on the sliders 52D using the flexor fixtures 52F, and the belt fixtures 52A are installed on the belt flexors 52C. Simultaneously, the safety support 80 is installed below the reflecting mirror 31.

The belt 51 is fitted into the belt constraint recess 82A of the safety support 80 and between the belt fixtures 52A so as to surround the circumference of the reflecting mirror 31, and is aligned with the circumference of the reflecting mirror 31. Then, the belt 51 is pulled between the two belt flexors 52C assembled to the belt fixtures 52A, thereby bringing the belt 51 into close contact with the circumference of the reflecting mirror 31. Each fixture friction 52B is coupled to fix the belt 51 to the belt fixtures 52A. The interval of each belt positioner 52G is adjusted to correspond to the thickness of the reflecting mirror 31, and thus the belt 51 is fixed to the reflecting mirror 31.

After the belt 51 is installed so as to surround the circumference of the reflecting mirror 31, a plurality of load supports 40 are installed on the circumference of the reflecting mirror 31. The frame 30 is again rotated so as to be perpendicular to the ground.

In the belt supporting type reflecting mirror mount assembled in this way, the belt fastener 50, the leveling feet 33, and the load supports 40 primarily support the reflecting mirror 31, and the frame 30 bears the dead weight of each of the belt fastener 50, the leveling feet 33, and the load supports 40. The fork 20 bears the dead weight of the frame 30. The base 10 bears the dead weight of the fork 20. The level adjustors 90 installed on the base 10 bear the combined dead weight.

After the reflecting mirror 31 has been assembled by the foregoing process, the fork 20 and the frame 30 are pivoted to approximately adjust the reflection angle of the reflecting mirror 31. Then, the reflecting mirror 31 is swiveled and/or tilted by adjusting the adjusting bars 64 and 74 of the first and second micro-adjustors 60 and 70, so that the reflection angle can be finely and precisely adjusted.

With the foregoing construction, the circumference of the reflecting mirror 31 is supported while the load of the reflecting mirror 31 applied in a direction perpendicular to an optical axial direction is uniformly distributed by the belt 51. As such, the reflecting mirror 31 can be stable and the deformation amount thereof can be minimized. Since the reflection angle of the reflecting mirror 31 can be swiveled and/or tilted as needed, the precision of the alignment of the reflecting mirror 31 is improved.

Although an exemplary embodiment of the invention has been described for illustrative purposes, those skilled in the art will appreciate that various modifications, additions and substitutions are possible, without departing from the scope and spirit of the invention as disclosed in the accompanying claims.

What is claimed is:

1. A belt supporting type reflecting mirror mount comprising:
   a base;
   a fork coupled to the base so as to be able to be swiveled;
   a frame hinged to the fork, a reflecting mirror being disposed inside of the frame;
   at least one load support installed on the frame and supporting a load of the reflecting mirror applied in an optical axial direction; and
   a belt fastener that has a belt supporting a circumference of the reflecting mirror and belt supports installed on the frame and fixedly supporting opposite ends of the belt,
   wherein each belt support comprises: a pair of belt fixtures between which a first end of the belt is fitted; a fixture friction that is installed on the belt fixtures and fixes the belt using a frictional force; a pair of belt flexors that is fixed to the belt fixtures at a first end thereof and defines a length adjusting slit through which the belt is guided; a slider that is fixed to a second end of the belt flexors and is slidably installed on the frame; and a slider friction that is installed on the frame and fixes the slider using friction.

2. The belt supporting type reflecting mirror mount according to claim 1, wherein the belt support further comprises a belt positioner that fixes the belt to the circumference of the reflecting mirror so as to prevent the belt from moving undesirably.

3. The belt supporting type reflecting mirror mount according to claim 2, wherein:
   the belt positioner comprises an upper positioner having an elongated hole, and a lower positioner that is installed in symmetry with the upper positioner and has an elongated hole;
   the belt support is fastened by a fastening member passing through the upper and lower positioners; and
   the upper and lower positioners slide along the elongated holes to adjust an interval therebetween.

4. The belt supporting type reflecting mirror mount according to claim 1, wherein the frame contains slide slots, and the sliders are slidably installed in the slider slots respectively.

5. The belt supporting type reflecting mirror mount according to claim 1, wherein the load support comprises:
   a first support that is installed on the frame so as to be able to be positioned by sliding relative to the frame; and
   a second support that is coupled to the first support, supports the circumference of the reflecting mirror, and is installed so as to be able to be adjusted in height by sliding relative to the first support.

6. The belt supporting type reflecting mirror mount according to claim 5, wherein the second support is a leaf spring.

7. The belt supporting type reflecting mirror mount according to claim 1, further comprising:
   a first micro-adjustor that is installed between the base and the fork and swivels the fork; and
   a second micro-adjustor that is installed between the fork and the frame and tilts the frame,
   wherein the first or second micro-adjustor comprises a stationary bracket, a movable bracket that is installed apart from the stationary bracket, tension springs that are installed between the stationary bracket and the movable bracket, and an adjusting bar that is coupled to the stationary bracket and moves the movable bracket.

8. The belt supporting type reflecting mirror mount according to claim 7, wherein the movable bracket contains an opening, and the adjusting bar passes through the opening and moves forward and backward.

9. The belt supporting type reflecting mirror mount according to claim 1, further comprising a safety support that is installed on the frame and prevents the reflecting mirror from falling down.

10. The belt supporting type reflecting mirror mount according to claim 9, wherein the safety support comprises:
    an angle that is installed on the frame; and
    a reflecting mirror prop that is coupled to the angle so as to be able to move up and down, that supports the circumference of the reflecting mirror, and that has a belt constraint recess in which the belt is constrained.

11. The belt supporting type reflecting mirror mount according to claim 1, wherein the frame contains a plurality of leveling feet supporting one surface of the reflecting mirror.

12. The belt supporting type reflecting mirror mount according to claim 11, wherein the frame contains a plurality of elongate leveling foot fixture holes, and the leveling feet are installed and positioned in the respective leveling foot fixture holes.

* * * * *